United States Patent [19]
De Thouars et al.

[11] Patent Number: 5,818,910
[45] Date of Patent: Oct. 6, 1998

[54] TELECOMMUNICATION SYSTEM, AS WELL AS A TELECOMMUNICATION EXCHANGE, AS WELL AS A METHOD

[75] Inventors: Fréderic Henri Richard De Thouars, Voorburg; Gijsbertus Joannus Andreas Langelaan, Leidschendam, both of Netherlands

[73] Assignee: Koninklijke PTT Nederland N.V., Groningen, Netherlands

[21] Appl. No.: 561,986

[22] Filed: Nov. 22, 1995

[30] Foreign Application Priority Data

Aug. 12, 1994 [NL] Netherlands ............................ 9402065

[51] Int. Cl.$^6$ ..................................................... H04M 1/64
[52] U.S. Cl. ............................. 379/89; 379/207; 379/209
[58] Field of Search ................................ 379/67, 88, 89, 379/76, 201, 207, 209

[56] References Cited

U.S. PATENT DOCUMENTS

| | | | |
|---|---|---|---|
| 4,446,336 | 5/1984 | Bethel et al. | 379/89 |
| 4,706,270 | 11/1987 | Astegiano et al. | 379/84 |
| 4,933,967 | 6/1990 | Lo et al. | 379/207 |
| 5,056,086 | 10/1991 | Libonati | 379/88 |
| 5,541,981 | 7/1996 | Lyan | 379/88 |
| 5,659,599 | 8/1997 | Arumainayagan et al. | 379/89 |

FOREIGN PATENT DOCUMENTS

| | | |
|---|---|---|
| 0412799 | 2/1991 | European Pat. Off. . |
| 1915763 | 10/1970 | Germany . |
| 2213349 | 8/1989 | United Kingdom . |
| 9115916 | 10/1991 | WIPO . |

OTHER PUBLICATIONS

N. Crisp, "Sourcing Voice Services —Voice Services Equipment, Auxiliary Switch and Voice Applications", British Telecommunications Engineering, vol. 11, Apr. 1992, pp. 14–25.

*Primary Examiner*—Fan S. Tsang
*Attorney, Agent, or Firm*—Michaelson & Wallace; Peter L. Michaelson; Michael P. Straub

[57] ABSTRACT

Known telecommunication systems utilize of a telecommunication exchange with a switching matrix coupled to a storage device for storing a message. A calling subscriber dialing a certain telephone number will hear this message, whereafter he may be put through. An advertising subscriber dialing a different telephone number, gains access to the storage device, in order to enable him to modify his message. The sometimes poor access option to said storage device may be considerably enhanced by extending the telecommunication system by a further storage device which provides a better access option and in which the new message is provisionally stored. The new message is then fed, at a convenient moment for the telecommunication system, to the storage device. Apart from this, an advertising subscriber, due to application of a table memory in the further storage device, needs to pass through a modification procedure only once, even if the message should be modified in several storage devices.

14 Claims, 3 Drawing Sheets

TELECOMMUNICATION SYSTEM, AS WELL AS A TELECOMMUNICATION EXCHANGE, AS WELL AS A METHOD

A. BACKGROUND OF THE INVENTION

The invention relates to a telecommunication system comprising at least one telecommunication exchange provided with at least one switching matrix controllable by a processor for coupling to telecommunication connections, and at least one storage device capable of being coupled to the switching matrix for storing a message, which storage device is provided with receiving means for receiving a first control signal originating from the switching matrix, and for receiving a second control signal originating from the switching matrix, and which storage device is provided with memory means for storing, in response to the first control signal, the message originating from the switching matrix, and which is provided with generating means for generating, in response to the second control signal, the message to be transmitted by way of the switching matrix and by way of a telecommunication connection.

Such a telecommunication system is of general knowledge. The telecommunication exchange disposes of the switching matrix controllable by a processor, which is coupled to telecommunication connections. A signal arrived by way of a first telecommunication connection, e.g., a telephone number dialed by a calling subscriber, is passed on by way of the switching matrix to the processor, which analyzes the signal and in response thereto drives the switching matrix in such a manner that the first telecommunication connection is put through to a second telecommunication connection. In this case, the signal arrived by way of the first telecommunication connection may, or may not, be transmitted by way of the second telecommunication connection. The storage device capable of being coupled to the switching matrix is, e.g., a so-called voice response system and disposes of the receiving means, the memory means and the generating means. The second control signal originating from the calling subscriber and received by way of the first telecommunication connection, e.g., the telephone number dialed by the calling subscriber, is passed on by way of the switching matrix to the processor, which analyzes said second control signal and, in response thereto, drives the switching matrix in such a manner that the second control signal is passed on to the receiving means of the storage device. The receiving means in response thereto drive the memory means and the generating means in such a manner that the message stored in the memory means is generated by the generating means, which message is then transmitted by way of the switching matrix and by way of the first telecommunication connection to the calling subscriber. Subsequently, the first telecommunication connection may, or may not, be put through to the second telecommunication connection.

If, e.g., an advertising subscriber desires to modify his message, which is intended for calling subscribers and which is to be generated by the generating means of the storage device, the advertising subscriber generates the first control signal, e.g., an other telephone number chosen by the advertising subscriber. The first control signal is passed on by way of the switching matrix to the processor, which analyzes the first control signal and in response thereto drives the switching matrix in such a manner that the first control signal is passed on to the receiving means of the storage device. The receiving means in response thereto drive the memory means in such a manner that a new message originating from the advertising subscriber and arriving by way of the first telecommunication connection and by way of the switching matrix is stored in the memory means. When subsequently the calling subscriber generates the second control signal by way of the first telecommunication connection, it is passed on by way of the switching matrix to the processor, which analyzes the second control signal and in response thereto drives the switching matrix in such a manner that the second control signal is passed on to the receiving means of the storage device. The receiving means in response thereto drive the memory means and the generating means in such a manner that the new message stored in the memory means is generated by the generating means, which new message is then transmitted by way of the switching matrix and by way of the first telecommunication connection to the calling subscriber.

Such a telecommunication system has the drawback, inter alia, that the storage device, e.g., a voice response system, can only serve a limited number of subscribers (substantially) at the same time, as a result of which an advertising subscriber will sometimes not succeed in modifying his message. Such is the case, e.g., both if too many advertising subscribers each desire to modify their message at the same time, and when an advertising subscriber wishes to modify his message at a moment on which the maximum number of calling subscribers are each fed a different message, and when an advertising subscriber wishes to modify his message at a moment on which a calling subscriber is already fed the message to be modified.

B. SUMMARY OF THE INVENTION

The object of the invention is, inter alia, to provide a telecommunication system of the type referred to in the preamble, enabling an advertising subscriber to modify his message independently from the degree of occupation and/or the capacity of the storage device.

For this purpose, the telecommunication system of the invention is characterized by the telecommunication system comprising a further storage device capable of being coupled to the telecommunication exchange, which is provided with further receiving means for receiving a further control signal, further memory means for storing, in response to the further control signal, the message, and further generating means for generating the first control signal to be transmitted to the storage device and for generating the message to be transmitted to the storage device.

By extending the telecommunication system by the further storage device, which is capable of being coupled to the telecommunication exchange by way of several intermediate telecommunication connections, an advertising subscriber may modify his message independently from the degree of occupation and/or the capacity of the storage device by having the new message provisionally stored in the further storage device. For this purpose, the further storage device comprises: further receiving means for receiving, possibly by way of the switching matrix, the further control signal which, e.g., originates from the advertising subscriber, or is generated in response to a certain activity of the advertising subscriber, further memory means for storing, in response to the further control signal, the new message, and further generating means for generating the first control signal to be transmitted to the storage device and for generating the message to be transmitted to the storage device.

As a consequence of the substantially greater possible storage capacity of the further storage device (because it is coupled to the switching matrix in less direct manner), and as a consequence of the substantially greater possible number of intermediate telecommunication connections with respect to the limited number of subscribers which the storage device may serve, the chance of success of an advertising subscriber trying to reach the further storage device will be much greater than the chance of success of an advertising subscriber trying to reach the storage device.

The invention is based, inter alia, on the insight that new messages replacing old messages, prior to the actual replacement, may be provisionally stored elsewhere (in the further storage device), and that the telecommunication system may then decide when it is the most convenient point in time to have the replacement effected by way of the intermediate telecommunication connections.

In this manner, the problem of a sometimes bad access to the storage device of a telecommunication system is solved by extending this telecommunication system by the further storage device which provides a better access option. An added advantage of the telecommunication system is extending the further storage device by a time mechanism to be set by an advertising subscriber, the actual replacement of the old message by the new message takes place only at a point in time set by said advertising subscriber.

A first embodiment of the telecommunication system of the invention is characterized by the telecommunication system comprising at least one subsequent storage device capable of being coupled to a subsequent switching matrix controllable by a subsequent processor for storing the message, which subsequent storage device is provided with subsequent receiving means for receiving a subsequent first control signal originating from the subsequent switching matrix and for receiving a subsequent second control signal originating from the subsequent switching matrix and which subsequent storage device is provided with subsequent memory means for storing, in response to the subsequent first control signal, the message originating from the subsequent switching matrix and is provided with subsequent generating means for generating, in response to the subsequent second control signal, the message to be transmitted by way of the subsequent switching matrix and by way of a telecommunication connection, the subsequent storage device being provided with a table memory for mutually related storing the first control signal and the subsequent first control signal, and the further generating means generating the first control signal to be transmitted to the storage device and the message to be transmitted to the storage device, and generating the subsequent first control signal to be transmitted to the subsequent storage device and the message to be transmitted to the subsequent storage device.

The present telecommunication system therefore possesses a total of at least two storage devices, each of which is coupled to a different switching matrix. Normally, an advertising subscriber, by generating the first control signal, e.g., a telephone number chosen by the advertising subscriber, and by generating the subsequent first control signal, e.g., a subsequent telephone number chosen by the advertising subscriber, should have modified both mutually corresponding messages in both storage devices. By applying the table memory in the further storage device, the advertising subscriber needs to generate the further control signal only once, or to carry out a certain activity only once, in response whereto said further control signal is then generated.

A second embodiment of the telecommunication system of the invention is characterized by the telecommunication system comprising at least one again subsequent storage device capable of being coupled to the witching matrix controllable by the processor for storing the message, wherein the gain subsequent storage device is provided with again subsequent receiving means for receiving an again subsequent first control signal originating from the switching matrix, and for receiving an again subsequent second control signal originating from the switching matrix and which again subsequent storage device is provided with again subsequent memory means for storing, in response to the again subsequent first control signal, the message originating from the switching matrix and is provided with again subsequent generating means for generating, in response to the again subsequent second control signal, the message to be transmitted by way of the switching matrix and by way of a telecommunication connection, the further storage device being provided with a table memory for mutually related storing the first control signal and the again subsequent first control signal, and the further generating means generating the first control signal to be transmitted to the storage device and the message to be transmitted to the storage device, and generating the again subsequent first control signal to be transmitted to the again subsequent storage device and the message to be transmitted to the again subsequent storage device.

The present telecommunication system therefore possesses a total of at least two storage devices, each of which is coupled to the same switching matrix. Normally, an advertising subscriber, by generating the first control signal, e.g., a telephone number chosen by the advertising subscriber, and by generating the again subsequent first control signal, e.g., an again subsequent telephone number chosen by the advertising subscriber, should have modified both mutually corresponding messages in both storage devices. By applying the table memory in the further storage device, the advertising subscriber needs to generate the further control signal only once, or to carry out a certain activity only once, in response whereto said further control signal is then generated.

The invention further relates to a telecommunication exchange provided with at least one switching matrix controllable by a processor for coupling to telecommunication connections, and at least one storage device capable of being coupled to the switching matrix for storing a message, which storage device is provided with receiving means for receiving a first control signal originating from the switching matrix, and for switching a second control signal originating from the receiving matrix, and which storage device is provided with memory means for storing, in response to the first control signal, the message originating from the switching matrix, and is provided with generating means for generating, in response to the second control signal, the message to be transmitted by way of the switching matrix and by way of a telecommunication connection.

The telecommunication exchange of the invention is characterized by the telecommunication exchange comprising a further storage device provided with further receiving means for receiving a further control signal, further memory means for storing, in response to the further control signal, the message, and further generating means for generating the first control signal to be transmitted to the storage device and for generating the message to be transmitted to the storage device.

A first embodiment of the telecommunication exchange of the invention is characterized by the telecommunication exchange comprising at least one subsequent storage device, capable of being coupled to a subsequent switching matrix controllable by a subsequent processor, for storing the message, which subsequent storage device is provided with subsequent receiving means for receiving a subsequent first control signal originating from the subsequent switching matrix, and for receiving a subsequent second control signal originating from the subsequent switching matrix and which subsequent storage device is provided with subsequent memory means for storing, in response to the subsequent first control signal, the message originating from the subsequent switching matrix, and is provided with subsequent generating means for generating, in response to the subsequent second control signal, the message to be transmitted by way of the subsequent switching matrix and by way of a telecommunication connection, the subsequent storage device being provided with a table memory for mutually related storing the first control signal and the subsequent first control signal, and the further generating means generating the first control signal to be transmitted to the storage device and the message to be transmitted to the storage device, and generating the subsequent first control signal to be transmitted to the subsequent storage device and the message to be transmitted to the subsequent storage device.

A second embodiment of the telecommunication exchange of the invention is characterized by the telecommunication exchange comprising at least one again subsequent storage device capable of being coupled to the switching matrix controllable by the processor for storing the message, which again subsequent storage device is provided with again subsequent receiving means for receiving an again subsequent first control signal originating from the switching matrix, and for receiving an again subsequent second control signal originating from the switching matrix, and which again subsequent storage device is provided with again subsequent memory means for storing, in response to the again subsequent first control signal, the message originating from the switching matrix, and is provided with again subsequent generating means for generating, in response to the again subsequent second control signal, the message to be transmitted by way of the switching matrix and by way of a telecommunication connection, the further storage device being provided with a table memory for mutually related storing the first control signal and the again subsequent first control signal, and the further generating means generating the first control signal to be transmitted to the storage device and the message to be transmitted to the storage device, and generating the again subsequent first control signal to be transmitted to the again subsequent storage device and the message to be transmitted to the again subsequent storage device.

The invention again further relates to a method for storing a message in a storage device, which storage device is capable of being coupled to a switching matrix controllable by a processor for coupling to telecommunication connections, which switching matrix is a part of a telecommunication exchange, which storage device and which telecommunication exchange are parts of a telecommunication system, and which method comprises the steps of receiving, by the storage device, a first control signal originating from the switching matrix, storing, by the storage device in response to the first control signal, the message originating from the switching matrix for generating, in response to a second control signal, the message to be transmitted by way of the switching matrix and by way of a telecommunication connection.

The method of the invention is characterized by the method comprising the steps of receiving, by a further storage device, a further control signal, storing, by the further storage device in response to the further control signal, the message, generating, by the further storage device, the first control signal to be transmitted to the storage device, and generating, by the further storage device, the message to be transmitted to the storage device.

A first embodiment of the method of the invention is characterized by the telecommunication system comprising a subsequent storage device for storing the message, which subsequent storage device is capable of being coupled to a subsequent switching matrix controllable by a subsequent processor for coupling to telecommunication connections, which subsequent switching matrix is a part of the telecommunication exchange, which subsequent storage device and which telecommunication exchange are parts of the telecommunication system, and which method comprises the steps of receiving, by the subsequent storage device, a subsequent first control signal originating from the subsequent switching matrix, storing, by the subsequent storage device in response to the subsequent first control signal, the message originating from the subsequent switching matrix for generating, in response to a subsequent second control signal, the message to be transmitted by way of the subsequent switching matrix and by way of a telecommunication connection, generating, by the further storage device, the subsequent first control signal to be transmitted to the subsequent storage device, generating, by the further storage device, the message to be transmitted to the subsequent storage device, he first control signal and the subsequent first control signal being stored mutually related in a table memory of the further storage device.

A second embodiment of the method of the invention is characterized by the telecommunication system comprising an again subsequent storage device for storing the message, which again subsequent storage device is capable of being coupled to the switching matrix controllable by the processor for coupling to telecommunication connections, which switching matrix is a part of the telecommunication exchange, which again subsequent storage device and which telecommunication exchange are parts of the telecommunication system, and which method comprises the steps of receiving, by the again subsequent storage device, an again subsequent first control signal originating from the switching matrix, storing, by the again subsequent storage device in response to the again subsequent first control signal, the message originating from the switching matrix for generating, in response to an again subsequent second control signal, the message to be transmitted by way of the switching matrix and by way of a telecommunication connection, generating, by the further storage device, the again subsequent first control signal to be transmitted to the again subsequent storage device, generating, by the further storage device, the message to be transmitted to the again subsequent storage device, the first control signal and the again subsequent first control signal being stored mutually related in a table memory of the further storage device.

In WO 09/15916, a system is disclosed for playing, by way of a telephone line, recorded speech messages, and in GB 2 213 349 a device is disclosed for visually displaying recorded speech signals both WO 09/15916,the GB 2 213 349 references, as well as the applicants' Dutch priority application NL 9402065, are all incorporated by reference herein. The invention in which new messages replacing old messages, prior to the actual replacement, may be provisionally stored elsewhere (in the further storage device), and in which the telecommunication system may then decide when it is the most convenient point in time to have the replacement effected by way of the intermediate telecommunication connections, is not disclosed in these references.

C. BRIEF DESCRIPTION OF THE DRAWINGS

The invention will be explained in greater detail by reference to an exemplary embodiment shown in the Figures in which.

D. DETAILED DESCRIPTION

Figure 1:
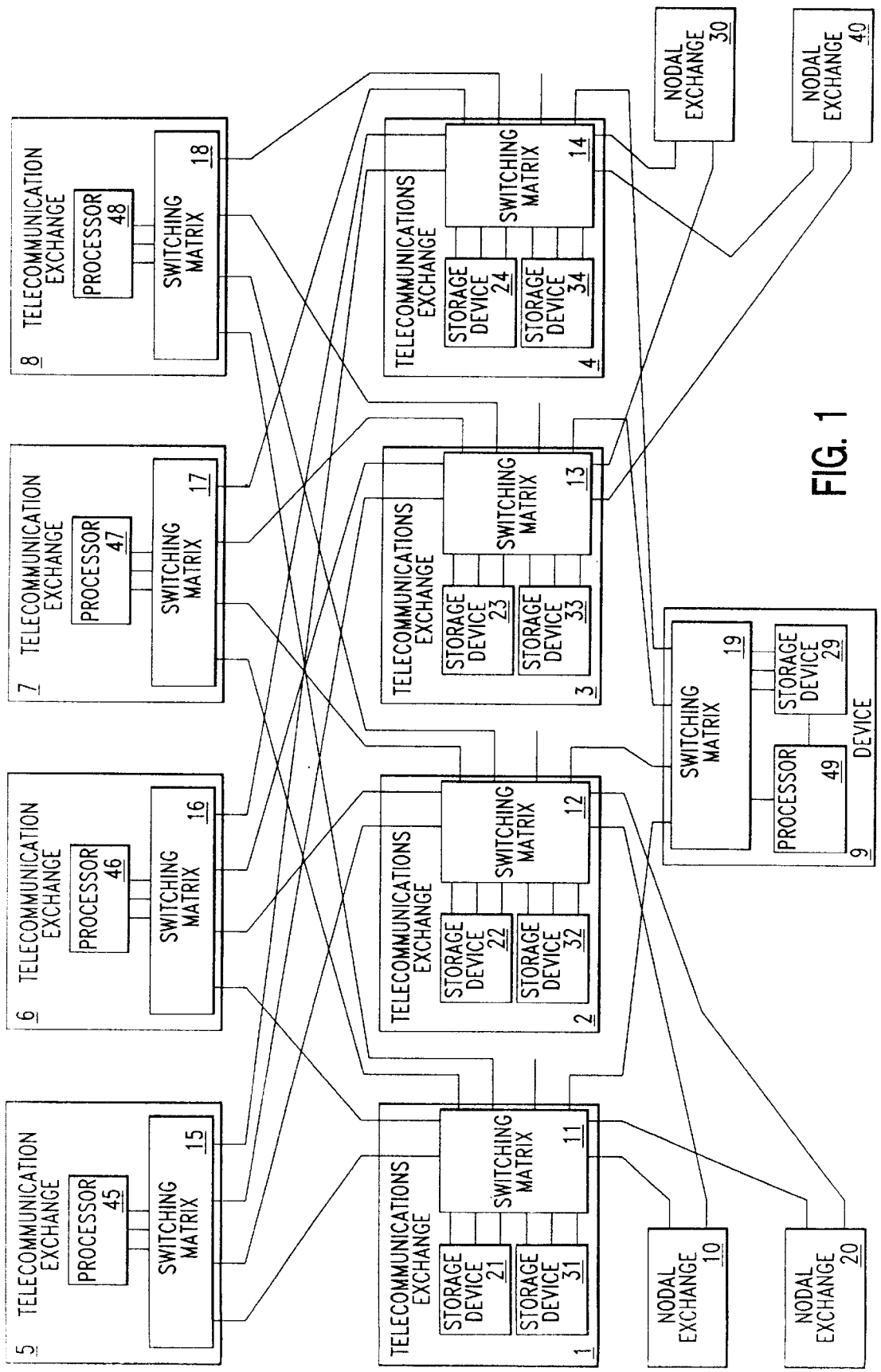
FIG. 1 shows a telecommunication system in accordance with the invention.

The telecommunication system of the invention shown in FIG. 1 comprises four telecommunication exchanges 1, 2, 3 and 4, respectively, each of which is provided with a switching matrix 11, 12, 13 and 14, respectively, with a storage device 21, 22, 23 and 24, respectively, connected to the switching matrix 11, 12, 13 and 14, respectively, and with a storage device 31, 32, 33 and 34, respectively, connected to the switching matrix 11, 12, 13 and 14, respectively. The telecommunication system of the invention shown in FIG. 1 further comprises four telecommunication exchanges 5, 6, 7 and 8, respectively, each provided with a switching matrix 15, 16, 17 and 18, respectively, and with a processor 45, 46, 47 and 48, respectively, connected to the switching matrix 15, 16, 17 and 18, respectively. The telecommunication system of the invention shown in FIG. 1 also disposes of a further device 9, which is provided with a further switching matrix 19, with a further storage device 29 coupled to the further switching matrix 19, and with a further processor 49 coupled to the further switching matrix 19 and to the further storage device 29. Switching matrices 11, 12, 13 and 14 are each coupled, by way of a telecommunication connection, to switching matrix 15, to switching matrix 16, to switching matrix 17, to switching matrix 18 and to switching matrix 19. Switching matrices 11 and 12 are each coupled, by way of a telecommunication connection, to a nodal exchange 10 not shown in FIG. 1, and are each coupled, by way of a telecommunication connection, to a nodal exchange 20 not shown in FIG. 1. Switching matrices 13 and 14 are each coupled, by way of a telecommunication connection, to a nodal exchange 30 not shown in FIG. 1, and are each coupled, by way of a telecommunication connection, to a nodal exchange 40 not shown in FIG. 1.

The operation of the prior-art part long known of the telecommunication system shown in FIG. 1, i.e., of the part of the telecommunication system in which device 9 is lacking, is as follows. A signal arrived at telecommunication exchange 1, e.g., by way of the nodal exchange 10 not shown in FIG. 1 and, e.g., by way of a first telecommunication connection, e.g., a telephone number dialed by a calling subscriber, is passed on by way of switching matrix 11 to telecommunication exchange 5, with processor 45 receiving said signal by way of switching matrix 15 and analysing said signal and, in response thereto, driving switching matrix 11 in such a manner that the first telecommunication connection coupled to the nodal exchange 10 not shown in FIG. 1 is put through to, e.g., a second telecommunication connection coupled to the nodal exchange 20 not shown in FIG. 1. Here, the signal arrived by way of the first telecommunication connection may, or may not, be transmitted by way of the second telecommunication connection.

The storage device 21 coupled to switching matrix 11 is, e.g., a so-called voice response system. A second control signal originating from the calling subscriber and, e.g., to be received by way of the first telecommunication connection, e.g., a telephone number dialed by the calling subscriber, is passed on, by way of switching matrix 11, to telecommunication exchange 5, with processor 45 receiving said signal by way of switching matrix 15 and analysing said signal and, in response thereto, driving switching matrix 11 in such a manner that the second control signal is passed on to storage device 21. In response thereto, a message stored in storage device 21 is generated, which message is then transmitted by way of switching matrix 11 and by way of the first telecommunication connection to the calling subscriber. Subsequently, the first telecommunication connection may, or may not, be put through to the second telecommunication connection.

If, e.g., an advertising subscriber desires to modify his message intended for calling subscribers and to be generated by storage device 21, said advertising subscriber generates a first control signal, e.g., an other telephone number chosen by the advertising subscriber. Said first control signal is passed on, e.g., by way of the first telecommunication connection and by way of switching matrix 11, to telecommunication exchange 5, with processor 45 receiving said signal by way of switching matrix 15 and analysing said signal and, in response thereto, driving switching matrix 11 in such a manner that the first control signal is passed on to storage device 21. In response thereto, a new message originating from the advertising subscriber and arriving by way of the first telecommunication connection and by way of switching matrix 11 is stored in storage device 21. When the calling subscriber subsequently generates the second control signal by way of, e.g., the first telecommunication connection, this is passed on by way of switching matrix 11 to telecommunication exchange 5, with processor 45 receiving said signal by way of switching matrix 15 and analysing said signal and, in response thereto, driving switching matrix 11 in such a manner that the second control signal is passed on to storage device 21. In response thereto, the new message stored in storage device 21 is generated, which new message is then transmitted by way of switching matrix 11 and by way of the first telecommunication connection to the calling subscriber. Subsequently, the first telecommunication connection may, or may not, be put through to the second telecommunication connection.

Since in the storage devices 21, 22, 23, 24, 31, 32, 33 and 34 the same message is stored for each advertising subscriber, said advertising subscriber should then replace his old message by the new message eight times, eight different telephone numbers therefore having to be chosen consecutively. This is very customer-unfriendly. In addition, the possibility exists that the advertising subscriber temporarily gains no access to at least one of the storage devices 21, 22, 23, 24, 31, 32, 33 and 34, e.g., due to the fact that too many advertising subscribers each desire to modify their message at the same time, and/or due to the fact that an advertising subscriber desires to modify his message at a moment on which the maximum number of calling subscribers each are already being fed a different message, and/or due to the fact that an advertising subscriber desires to modify his message at a moment on which a calling subscriber is already being fed the message to be modified. Apart from this, it is sometimes physically impossible for a subscriber to consecutively gain access, by way of one certain nodal exchange, to all telecommunication exchanges 1, 2, 3 and 4. Thus, it is impossible for a subscriber in the telecommunication system shown in FIG. I to be put through, by way of nodal exchange 10, to telecommunication exchanges 3 and 4, so that modifying messages stored in storage devices 23, 33, 24 and 34 from nodal exchange 10 is impossible by definition (after all, switching matrices 15, 16, 17 and 18 cannot be used here). All said problems, however, no longer occur in the telecommunication system of the invention.

The operation of the telecommunication system of the invention shown in FIG. 1, i.e., of the telecommunication system to which device 9 is added, is as follows. If, e.g., an advertising subscriber desires to modify his message intended for calling subscribers and to be generated by one of the storage devices 21, 22, 23, 24, 31, 32, 33 and 34 (depending on which subscriber is calling from where and at what time), said advertising subscriber generates the first control signal, e.g., the other telephone number chosen by the advertising subscriber. Said first control signal is passed on, e.g., by way of the first telecommunication connection and by way of switching matrix 11 to telecommunication exchange 5, with processor 45 receiving said signal by way of switching matrix 15 and analysing said signal and, in response thereto, driving one of the switching matrices 11, 12, 13 and 14 in such a manner that a further control signal originating from telecommunication exchange 5 is passed on to device 9. In response to said further control signal, which is either equal to the first control signal or different from said first control signal, a new message originating from the advertising subscriber and arriving by way of the first telecommunication connection and by way of switching matrix 11 is stored in further storage device 29 by way of further switching matrix 19. Subsequently device 9, at a moment which is most convenient for the telecommunication system and/or at a moment set by the advertising subscriber, generates first control signals intended for telecommunication exchanges 1, 2, 3 and 4, respectively, which are fed simultaneously (and then possibly in duplicate) or consecutively (and then possibly twice) to all telecommunication exchanges 1, 2, 3 and 4, respectively, (and therefore four or eight different telephone numbers which are, e.g., stored mutually related in a table memory present in further processor 49 and not shown in FIG. 1). Said first control signals are passed on, by way of switching matrix 19 and by way of switching matrices 11, 12, 13 and 14, respectively, to telecommunication exchanges 5, 6, 7 and 8, respectively, with processors 45, 46, 47 and 48, respectively, receiving said signals by way of switching matrices 15, 16, 17 and 18, respectively and analysing said signals, and, in response thereto, driving switching matrices 11, 12, 13 and 14, respectively, in such a manner that said first control signals are passed on to storage devices 21 and 31, 22 and 32, 23 and 33, and 24 and 34, respectively. In response thereto, the new message originating from device 9 and arriving by way of switching matrices 11, 12, 13 and 14, respectively, is stored in the storage devices 21 and 31, 22 and 32, 23 and 33, and 24 and 34, respectively. When subsequently a calling subscriber generates the second control signal by way of, e.g., a third telecommunication connection, this is passed on by way of switching matrix 14 to telecommunication exchange 8, with processor 48 receiving said signal by way of switching matrix 18 and analysing said signal and, in response thereto, driving switching matrix 14 in such a manner that the second control signal is passed on to storage device 24 or 34. In response thereto, the new message stored in storage device 24 or 34 is generated, which new message is then transmitted by way of switching matrix 14 and by way of the third telecommunication connection to the calling subscriber. Subsequently, the third telecommunication connection may, or may not, be put through to a fourth telecommunication connection.

Figure 2:
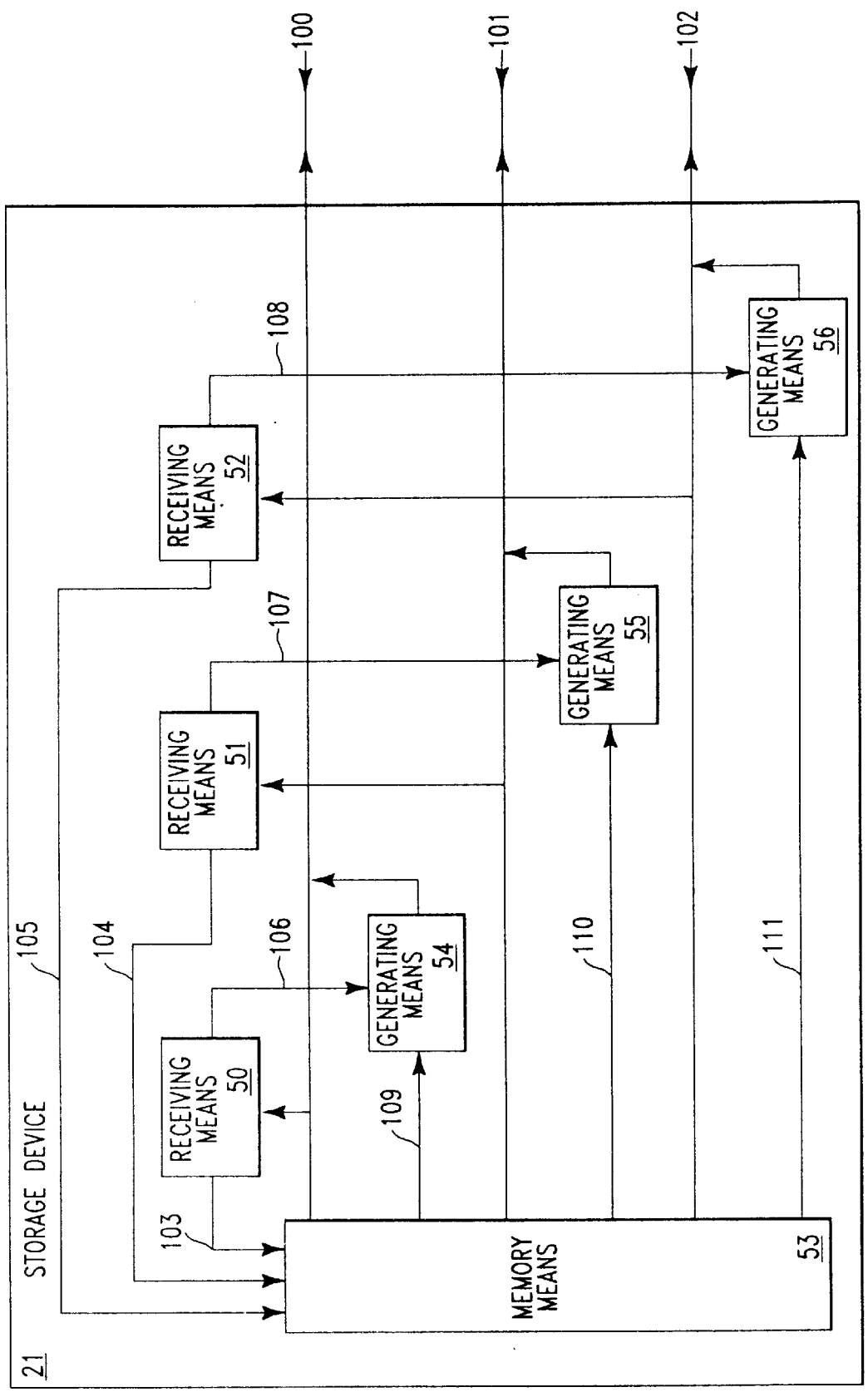
FIG. 2 shows a storage device for application in the telecommunication system.

The prior-art storage device 21 shown in FIG. 2 for application in prior-art telecommunication systems and/or telecommunication systems in accordance with the invention comprises receiving means 50, 51 and 52, respectively, inputs of which are connected to connections 100, 101 and 102, respectively, for receiving first and second control signals. First control outputs of receiving means 50, 51 and 52, respectively, are connected by way of connections 103, 104 and 105, respectively, to control inputs of memory means 53, three data inputs of which are connected to connections 100, 101 and 102, respectively, for receiving, in response to first control signals, new messages to be stored. Three data outputs of memory means 53 are connected by way of connections 109, 110 and 111, respectively, to generating means 54, 55 and 56, respectively, outputs of which are connected to connections 100, 101 and 102, respectively, for generating messages in response to second control signals. Control inputs of generating means 54, 55 and 56, respectively, are connected by way of connections 106, 107 and 108, respectively, to second control outputs of receiving means 50, 51 and 52, respectively.

The operation of the storage device 21 shown in FIG. 2 is as follows. A second control signal arriving from switching matrix 11 by way of connection 100 is received by receiving means 50. In response thereto, receiving means 50 by way of connection 103 drive memory means 53 in such a manner, that memory means 53 by way of connection 109 feed a message stored in memory means 53 to generating means 54, which generate said message by way of connection 100 into the direction of switching matrix 11. A first control signal arriving from switching matrix 11 by way of connection 100 is received by receiving means 50. In response thereto, receiving means 50 by way of connection 103 drive memory means 53 in such a manner that memory means 53 store a new message originating from switching matrix 11 and arriving by way of connection 100.

Figure 3:
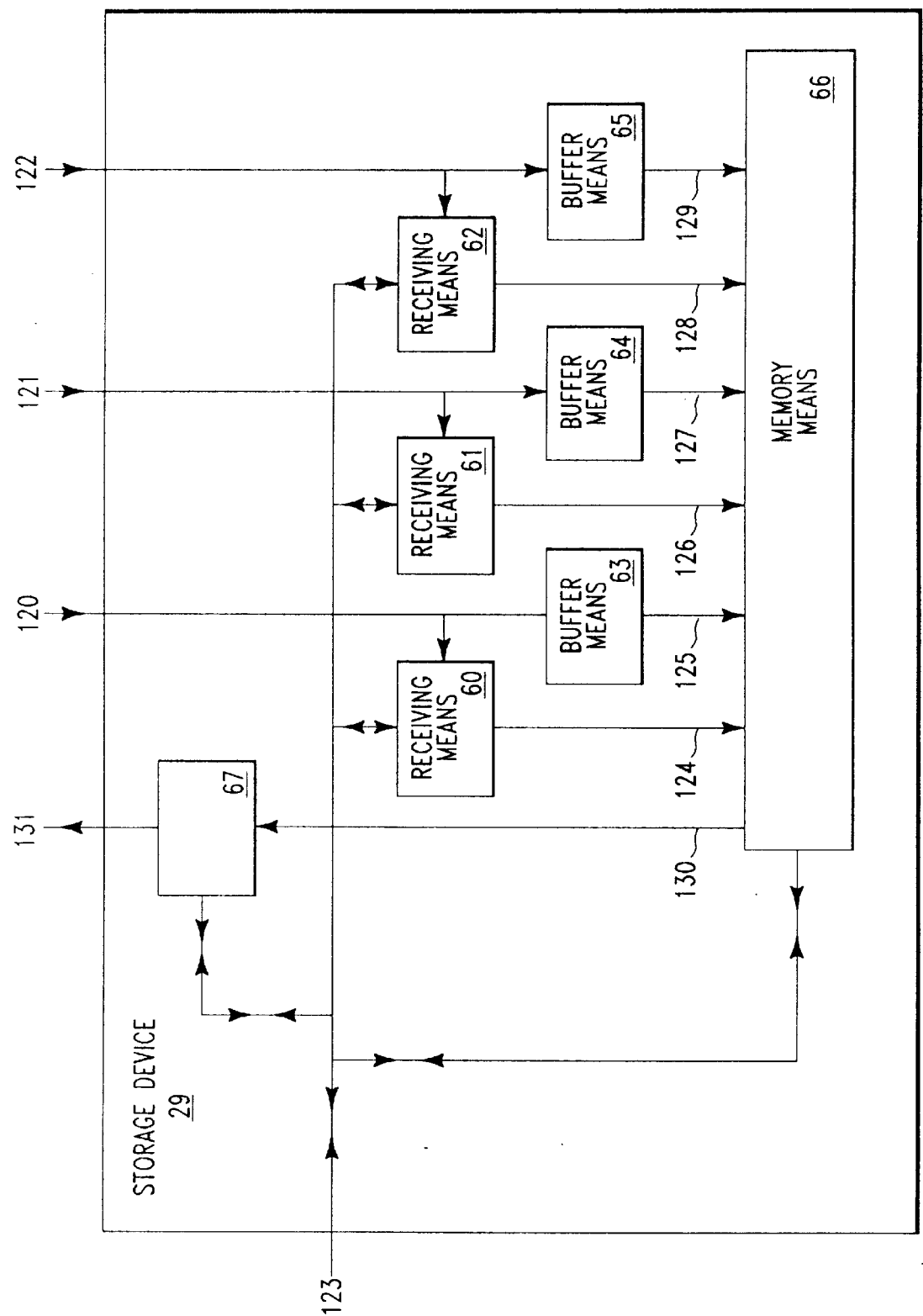
FIG. 3 shows a further storage device for application in the telecommunication system.

The further storage device 29 shown in FIG. 3 for application in the telecommunication system of the invention comprises further receiving means 60, 61 and 62, respectively, inputs of which are connected to connections 120, 121 and 122, respectively, for receiving further control signals. Control outputs of further receiving means 60, 61 and 62, respectively, are connected by way of connections 124, 126 and 128, respectively, to control inputs of further memory means 66, three data inputs of which are connected by way of connections 125, 127 and 129, respectively, to outputs of buffer memories 63, 64 and 65 respectively, inputs of which are connected to connections 120, 121 and 122, respectively, for receiving, in response to further control signals, new messages to be stored. A data output of further memory means 66 is connected by way of connection 130 to an input of further generating means 67, an output of which is connected to connection 131 for generating first control signals and messages originating, e.g., from further memory means 66 and/or processor 49. A control input/output of further generating means 67 and control inputs/outputs of further receiving means 60, 61 and 62 are connected by way of connection 123 to further processor 49.

The operation of the further storage device 29 shown in FIG. 3 is as follows. A further control signal arriving from further switching matrix 19 by way of connection 120 is received by further receiving means 60. In response thereto, further receiving means 60 by way of connection 123 inform further processor 49 of the arrival of said further control signal, whereupon further processor 49 by way of connection 123 drives further memory means 66 in such a manner that further memory means 66 store a new message arriving by way of connection 120. Said new message may first be buffered in buffer memory 63. Subsequently, further processor 49, at a moment which is most convenient for the telecommunication system and/or at a moment set by the advertising subscriber (which information is fed to device 9, e.g., by way of information in the further control signal), generates first control signals intended for telecommunication exchanges 1, 2, 3 and 4, which are fed, e.g., consecutively (and then possibly twice) by way of connection 123 and by way of further generating means 67 and by way of further switching matrix 19 to all telecommunication exchanges 1, 2, 3 and 4, respectively, (and therefore four or eight different telephone numbers which are, e.g., stored mutually related in a table memory present in further processor 49 and not shown in FIG. 1). For each first control signal to be generated, further processor 49 by way of connection 123 drives further memory means 66 which, in response thereto, feed the message by way of connection 130 to further generating means 67, so that for each first control signal to be transmitted the message is furthermore sent along to the telecommunication exchanges 1, 2, 3 and 4, which then may store said new message, possibly as a replacement of an old message, in storage devices 21 and 31, 22 and 32, 23 and 33, and 24 and 34.

The telephone number to be dialed by the calling subscriber and the other telephone number to be chosen by the advertising subscriber might each be extended by an additional code in order thereby to increase the number of possible different advertisements per telephone number. By way of the voice response system, the calling subscriber and the advertising subscriber, respectively, might then, after having dialed the telephone number and having chosen the different telephone number, respectively, be requested by the voice response system to select said additional code.

The memory locations in the storage devices 21 (or in the memory means 53), 22, 23, 24, 31, 32, 33 and 34 and in the further storage device 29 (or in the further memory means 66) are determined, e.g., as follows. If the advertising subscriber desires to modify his message intended for calling subscribers, said advertising subscriber generates the first control signal, e.g., the different telephone number chosen by the advertising subscriber, possibly extended by the additional code. Said first control signal is passed on, e.g., by way of the first telecommunication connection and by way of switching matrix 11, to telecommunication exchange 5, with processor 45 receiving said signal by way of switching matrix 15 and analysing said signal and, in response thereto, driving one of the switching matrices 11, 12, 13 and 14 for passing on a further control signal originating from telecommunication exchange 5 to device 9. Said further control signal might consist, e.g., of an access number for device 9, supplemented by the different telephone number, possibly extended by the additional code. In addition, the further control signal might, e.g., consist of the access number for device 9, supplemented by a unique number generated by processor 45 in response to the different telephone number, possibly extended by the additional code. Apart from this, the further control signal might, e.g., consist of a unique dialing number for device 9, generated by processor 45 in response to the different telephone number, possibly extended by the additional code. In said three respective cases, the different telephone number, possibly extended by the additional code, the unique number and the unique dialing number determine the memory location in the further storage device 29, or in the further memory means 66. The four or eight different telephone numbers which, e.g., are stored mutually related in a table memory present in further processor 49 and not shown in FIG. 1, and which are fed to all telecommunication exchanges 1, 2, 3 and 4, respectively, by device 9 as first control signals intended for telecommunication exchanges 1, 2, 3 and 4 respectively, might then determine the memory locations in the storage devices 21 (or in the memory means 53), 22, 23, 24, 31, 32, 33 and 34.

In the further storage device 29 shown in FIG. 3, there are located the buffer memories 63, 64 and 65, which might be omitted if further memory means 66, by way of at least two of the connections 120, 121 and 122, may store, more or less at the same time, messages arriving approximately at the same time and/or if, e.g., it is prevented, by way of further processor 49, that at least two messages arrive approximately at the same time. Further receiving means 60, 61 and 62 might be integrated into further processor 49, the latter then starting to monitor the connections 120, 121 and 122 by way of connection 123 in a more direct manner. Further generating means 67 might at least partially be integrated into further processor 49, further processor 49 then having to generate, by way of connection 123, the four or eight first control signals, and having to transmit them, by way of connection 131, with such a drive of further memory means 66 for each first control signal that for each first control signal to be transmitted by way of connection 131, the corresponding message is sent along by way of connection 130.

In practice, it might be advantageous, for each storage device 21, 22, 23, 24, 31, 32, 33 and 34 to create a separate connection 131, as a result of which first control signals and corresponding messages might be transmitted to said storage devices in a fully parallel manner. The prior-art storage device 21 shown in FIG. 2 illustrates three sets, each comprising one connection with connected receiving means and generating means. In reality, e.g. there may be sixty-four sets present, and it might be further advantageous to create a division in memory means 53 in order to enable the simultaneous occurrence, within one and the same storage device, of the storage of a new message by a caller advertising with an advertisement, and the generation of an old message at the request of a caller replying to the same advertisement.

The initiative to start replacing old messages present in storage devices 21, 22, 23, 24, 31, 32, 33 and 34 by a new message stored in device 9, might originate both from device 9 and from at least one of the telecommunication exchanges 1, 2, 3, 4, 5, 6, 7 and 8, and might further depend on a time mechanism set, e.g., by an advertising caller. The coming into contact, by device 9, with at least one of the telecommunication exchanges 1, 2, 3 and 4 by way of at least one of the telecommunication exchanges 5, 6, 7 and 8, is basically not required and might be avoided by redefining the four or eight different telephone numbers (of each advertisement) which, e.g., are stored mutually related in a table memory present in further processor 49 and not shown in FIG. 1.

When, in a first part of the telecommunication system, use is made of analogue techniques as far as the signalling and/or the speech are concerned, and when in a second part of the telecommunication system use is made of digital techniques as far as the signalling and/or the speech are concerned, signal conversions known to the person skilled in the art will be required by means of prior-art analog-to-digital converters and digital-to-analog converters and, e.g., DTMF (Dual-Tone Multi-Frequency) detectors and DTMF generators. Of course, device 9 in particular will preferably be constructed fully digitally.

We claim:

1. A telecommunication system comprising:

at least one telecommunication exchange provided with at least one switching matrix controllable by a processor for coupling to telecommunication connections, and at least one storage device capable of being coupled to the switching matrix for storing a message, which storage device is provided with receiving means for receiving a first control signal originating from the switching matrix, and for receiving a second control signal originating from the switching matrix, and which storage device is provided with memory means for storing, in response to the first control signal, the message originating from the switching matrix, and which is provided with generating means for generating, in response to the second control signal, the message to be transmitted by way of the switching matrix and by way of a telecommunication connection, the telecommunication system comprising a further storage device capable of being coupled to the telecommunication exchange, which is provided with further receiving means for receiving a further control signal, further memory means for storing, in response to the further control signal, the message, and further generating means for generating the first control signal to be transmitted to the storage device and for generating the message to be transmitted to the storage device;

the telecommunication system further including:

at least one subsequent storage device capable of being coupled to a subsequent switching matrix controllable by a subsequent processor for storing the message, which subsequent storage device is provided with subsequent receiving means for receiving a subsequent first control signal originating from the subsequent switching matrix and for receiving a subsequent second control signal originating from the subsequent switching matrix, and which subsequent storage device is provided with subsequent memory means for storing, in response to the subsequent first control signal, the message originating from the subsequent switching matrix and is provided with subsequent generating means for generating, in response to the subsequent second control signal, the message to be transmitted by way of the subsequent switching matrix and by way of a telecommunication connection, the further storage device being provided with a table memory for mutually related storing the first control signal and the subsequent first control signal, and the further generating means generating the first control signal to be transmitted to the storage device and the message to be transmitted to the storage device and generating the subsequent first control signal to be transmitted to the subsequent storage device and the message to be transmitted to the subsequent storage device.

2. A telecommunication system, comprising:

at least one telecommunication exchange provided with at least one switching matrix controllable by a processor for coupling to telecommunication connections, and at least one storage device capable of being coupled to the switching matrix for storing a message, which storage device is provided with receiving means for receiving a first control signal originating from the switching matrix, and for receiving a second control signal originating from the switching matrix, and which storage device is provided with memory means for storing, in response to the first control signal, the message originating from the switching matrix, and which is provided with generating means for generating, in response to the second control signal, the message to be transmitted by way of the switching matrix and by way of a telecommunication connection, the telecommunication system comprising a further storage device capable of being coupled to the telecommunication exchange, which is provided with further receiving means for receiving a further control signal, further memory means for storing, in response to the further control signal, the message, and further generating means for generating the first control signal to be transmitted to the storage device and for generating the message to be transmitted to the storage device, the telecommunication system further including:

at least one again subsequent storage device capable of being coupled to the switching matrix controllable by the processor for storing the message, which again subsequent storage device is provided with again subsequent receiving means for receiving an again subsequent first control signal originating from the switching matrix, and for receiving an again subsequent second control signal originating from the switching matrix and which again subsequent storage device is provided with again subsequent memory means for storing, in response to the again subsequent first control signal, the message originating from the switching matrix and is provided with again subsequent generating means for generating, in response to the again subsequent second control signal, the message to be transmitted by way of the switching matrix and by way of a telecommunication connection, the further storage device being provided with a table memory for mutually related storing the first control signal and the again subsequent first control signal, and the further generating means generating the first control signal to be transmitted to the storage device and the message to be transmitted to the storage device, and generating the again subsequent first control signal to be transmitted to the again subsequent storage device and the message to be transmitted to the again subsequent storage device.

3. A telecommunication exchange, comprising:

at least one switching matrix controllable by a processor for coupling to telecommunication connections, and at least one storage device capable of being coupled to the switching matrix for storing a message, which storage device is provided with receiving means for receiving a first control signal originating from the switching matrix, and for receiving a second control signal originating from the switching matrix, and which storage device is provided with memory means for storing, in response to the first control signal, the message originating from the switching matrix, and is provided with generating means for generating, in response to the second control signal, the message to be transmitted by way of the switching matrix and by way of a telecommunication connection, the telecommunication exchange comprising a further storage device which is provided with further receiving means for receiving a further control signal, further memory means for storing, in response to the further control signal, the message, and further generating means for generating the first control signal to be transmitted to the storage device and for generating the message to be transmitted to the storage device, the telecommunication exchange further including:

at least one subsequent storage device capable of being coupled to a subsequent switching matrix controllable by a subsequent processor for storing the message, which subsequent storage device is provided with subsequent receiving means for receiving a subsequent first control signal originating from the subsequent switching matrix, and for receiving a subsequent second control signal originating from the subsequent switching matrix, and which subsequent storage device is provided with subsequent memory means for storing, in response to the subsequent first control signal, the message originating from the subsequent switching matrix, and is provided with subsequent generating means for generating, in response to the subsequent second control signal, the message to be transmitted by way of the subsequent switching matrix and by way of a telecommunication connection, the further storage device being provided with a table memory for mutually related storing the first control signal and the subsequent first control signal, and the further generating means generating the first control signal to be transmitted to the storage device and the message to be transmitted to the storage device, and generating the subsequent first control signal to be transmitted to the subsequent storage device and the message to be transmitted to the subsequent storage device.

4. A telecommunication exchange, comprising:

at least one switching matrix controllable by a processor for coupling to telecommunication connections, and at least one storage device capable of being coupled to the switching matrix for storing a message, which storage device is provided with receiving means for receiving a first control signal originating from the switching matrix, and for receiving a second control signal originating from the switching matrix, and which storage device is provided with memory means for storing, in response to the first control signal, the message originating from the switching matrix, and is provided with generating means for generating, in response to the second control signal, the message to be transmitted by way of the switching matrix and by way of a telecommunication connection, the telecommunication exchange comprising a further storage device which is provided with further receiving means for receiving a further control signal, further memory means for storing, in response to the further control signal, the message, and further generating means for generating the first control signal to be transmitted to the storage device and for generating the message to be transmitted to the storage device, the telecommunication exchange further including:

at least one again subsequent storage device capable of being coupled to the switching matrix controllable by the processor for storing the message, which again subsequent storage device is provided with again subsequent receiving means for receiving an again subsequent first control signal originating from the switching matrix, and for receiving an again subsequent second control signal originating from the switching matrix, and which again subsequent storage device is provided with again subsequent memory means for storing, in response to the again subsequent first control signal, the message originating from the switching matrix, and is provided with again subsequent generating means for generating, in response to the again subsequent second control signal, the message to be transmitted by way of the switching matrix and by way of a telecommunication connection, the further storage device being provided with a table memory for mutually related storing the first control signal and the again subsequent first control signal, and the further generating means generating the first control signal to be transmitted to the storage device and the message to be transmitted to the storage device, and generating the again subsequent first control signal to be transmitted to the again subsequent storage device and the message to be transmitted to the again subsequent storage device.

5. A method for storing a message in a storage device, which storage device is capable of being coupled to a switching matrix controllable by a processor for coupling to telecommunication connections, which switching matrix is a part of a telecommunication exchange, which storage device and which telecommunication exchange are parts of a telecommunication system, the method comprising the steps of:

receiving, by the storage device, a first control signal originating from the switching matrix, storing, by the storage device in response to the first control signal, the message originating from the switching matrix for generating, in response to a second control signal, the message to be transmitted by way of the switching matrix and by way of a telecommunication connection, the method comprising the steps of receiving, by a further storage device, a further control signal, storing, by the further storage device in response to the further control signal, the message, generating, by the further storage device, the first control signal to be transmitted to the storage device, and generating, by the further storage device, the message to be transmitted to the storage device, the telecommunication system comprising a subsequent storage device for storing the message, which subsequent storage device is capable of being coupled to a subsequent switching matrix controllable by a subsequent processor for coupling to telecommunication connections, which subsequent switching matrix is a part of the telecommunication exchange, which subsequent storage device and which telecommunication exchange are parts of the telecommunication system, the method further comprising the steps of:

receiving, by the subsequent storage device, a subsequent first control signal originating from the subsequent switching matrix, storing, by the subsequent storage device in response to the subsequent first control signal, the message originating from the subsequent switching matrix for generating, in response to a subsequent second control signal, the message to be transmitted by way of the subsequent switching matrix and by way of a telecommunication connection, generating, by the further storage device, the subsequent first control signal to be transmitted to the subsequent storage device, and generating, by the further storage device, the message to be transmitted to the subsequent storage device, the first control signal and the subsequent first control signal being stored mutually related in a table memory of the further storage device.

6. A method for storing a message in a storage device, which storage device is capable of being coupled to a switching matrix controllable by a processor for coupling to telecommunication connections, which switching matrix is a part of a telecommunication exchange, which storage device and which telecommunication exchange are parts of a telecommunication system, the method comprising the steps of:

receiving, by the storage device, a first control signal originating from the switching matrix, storing, by the storage device in response to the first control signal, the message originating from the switching matrix for generating, in response to a second control signal, the message to be transmitted by way of the switching matrix and by way of a telecommunication connection, the method comprising the steps of receiving, by a further storage device, a further control signal, storing, by the further storage device in response to the further control signal, the message, generating, by the further storage device, the first control signal to be transmitted to the storage device, and generating, by the further storage device, the message to be transmitted to the storage device, the telecommunication system comprising an again subsequent storage device for storing the message, which again subsequent storage device is capable of being coupled to the switching matrix controllable by the processor for coupling to telecommunication connections, which switching matrix is a part of the telecommunication exchange, which again subsequent storage device and which telecommunication exchange are parts of the telecommunication system, the method further comprising the steps of:

receiving, by the again subsequent storage device, an again subsequent first control signal originating from the switching matrix, storing, by the again subsequent storage device in response to the again subsequent first control signal, the message originating from the switching matrix for generating, in response to an again subsequent second control signal, the message to be transmitted by way of the switching matrix and by way of a telecommunication connection, generating, by the further storage device, the again subsequent first control signal to be transmitted to the again subsequent storage device, generating, by the further storage device, the message to be transmitted to the again subsequent storage device, the first control signal and the again subsequent first control signal being stored mutually related in a table memory of the further storage device.

7. The telecommunication system of claim 1, further comprising:

at least one again subsequent storage device capable of being coupled to the switching matrix controllable by the processor for storing the message, which again subsequent storage device is provided with again subsequent receiving means for receiving an again subsequent first control signal originating from the switching matrix, and for receiving an again subsequent second control signal originating from the switching matrix and which again subsequent storage device is provided with again subsequent memory means for storing, in response to the again subsequent first control signal, the message originating from the switching matrix and is provided with again subsequent generating means for generating, in response to the again subsequent second control signal, the message to be transmitted by way of the switching matrix and by way of a telecommunication connection, the further storage device being provided with a table memory for mutually related storing the first control signal and the again subsequent first control signal, and the further generating means generating the first control signal to be transmitted to the storage device and the message to be transmitted to the storage device, and generating the again subsequent first control signal to be transmitted to the again subsequent storage device and the message to be transmitted to the again subsequent storage device.

8. The telecommunication exchange of claim 3, further comprising;

at least one again subsequent storage device capable of being coupled to the switching matrix controllable by the processor for storing the message, which again subsequent storage device is provided with again subsequent receiving means for receiving an again subsequent first control signal originating from the switching matrix, and for receiving an again subsequent second control signal originating from the switching matrix, and which again subsequent storage device is provided with again subsequent memory means for storing, in response to the again subsequent first control signal, the message originating from the switching matrix, and is provided with again subsequent generating means for generating, in response to the again subsequent second control signal, the message to be transmitted by way of the switching matrix and by way of a telecommunication connection, the further storage device being provided with a table memory for mutually related storing the first control signal and the again subsequent first control signal, and the further generating means generating the first control signal to be transmitted to the storage device and the message to be transmitted to the storage device, and generating the again subsequent first control signal to be transmitted to the again subsequent storage device and the message to be transmitted to the again subsequent storage device.

9. The method according to claim 5, wherein the telecommunication system comprises an again subsequent storage device for storing the message, which again subsequent storage device is capable of being coupled to the switching matrix controllable by the processor for coupling to telecommunication connections, which switching matrix is a part of the telecommunication exchange, which again subsequent storage device and which telecommunication exchange are parts of the telecommunication system, the method further comprising the steps of:
receiving, by the again subsequent storage device, an again subsequent first control signal originating from the switching matrix,
storing, by the again subsequent storage device in response to the again subsequent first control signal, the message originating from the switching matrix for generating, in response to an again subsequent second control signal, the message to be transmitted by way of the switching matrix and by way of a telecommunication connection,
generating, by the further storage device, the again subsequent first control signal to be transmitted to the again subsequent storage device, and
generating, by the further storage device, the message to be transmitted to the again subsequent storage device, the first control signal and the again subsequent first control signal being stored mutually related in a table memory of the further storage device.

10. A system for storing and outputting a message, comprising:
a first telecommunication exchange, including:
a first switching matrix controllable by a first processor for coupling to telecommunication connections and for outputting a storage control signal;
a first storage device coupled to the first switching matrix for storing said message, the first storage device including:
receiving means for receiving a first control signal and a second control signal through the first switching matrix;
first memory means for storing, in response to the first control signal, said message; and
first means for outputting, in response to the second control signal, said message by way of the first switching matrix; and a second telecommunication exchange including:
a second switching matrix controllable by a second processor;
a second storage device coupled to the second switching matrix for storing said message, the second storage device including:
receiving means for receiving a subsequent first control signal and a subsequent second control signal through the second switching matrix;
second memory means for storing, in response to the subsequent first control signal, said message; and
means for outputting, in response to the subsequent second control signal, said message by way of the second switching matrix; and
a temporary storage device for receiving, temporarily storing, and outputting said message, the temporary storage device including:
means for receiving the storage control signal output by the first switching matrix;
third memory means for storing, in response to the storage control signal, said message; and
generating means for generating the first control signal, the subsequent first control signal, and for outputting said message.

11. The system of claim 10, wherein said message is an advertising message, the storage control signal is a telephone call from an advertiser; and wherein the second control signal and subsequent second control signal are telephone calls.

12. A method for storing and outputting a message, the method comprising the steps of:
operating a first switching matrix, included in a first telecommunication exchange, to output a storage control signal;
storing said message in a temporary storage device coupled to the first telecommunications exchange in response to the storage control signal;
operating the temporary storage device to generate a first control signal and to output said message;
supplying the first control signal and said message to the first telecommunication exchange;
operating the first switching matrix to receive the first control signal;
operating the first telecommunication exchange, in response to the receipt of the first control signal by the first switching matrix, to store said message in a first memory device included in the first telecommunication exchange;
operating the temporary storage device to generate a second control signal and to output said message for a second time;
supplying the second control signal and said message to a second telecommunication exchange coupled to the temporary storage device;
operating a second switching matrix included in the second telecommunication exchange to receive the second control signal;
operating the second telecommunication exchange, in response to the receipt of the second control signal by the second switching matrix, to store said message in a second memory device included in the second telecommunication exchange;
operating the first telecommunication exchange to output said message from the first memory device in response to a third control signal; and
operating the second telecommunication exchange, to output said message from the second memory device in response to a fourth control signal.

13. The method of claim 12, wherein said message is an advertising message, and wherein the storage control signal is a telephone call from an advertiser, the method further comprising the step of:
operating the temporary storage device to receive the telephone call, which operates as the storage control signal, from the advertiser.

14. The method of claim 13, wherein the third and fourth control signals are telephone calls, the method further comprising the steps of:
supplying the telephone call which operates as the third control signal to the first telecommunications exchange via a telecommunications network; and
supplying the telephone call which operates as the fourth control signal to the second telecommunications exchange via a telecommunications network.

* * * * *